(12) United States Patent
Bommaji

(10) Patent No.: US 6,810,483 B2
(45) Date of Patent: Oct. 26, 2004

(54) SYNCHRONIZING DATA AND FUNCTION OPCODES BETWEEN AN APPLICATION LAYER HAVING A FIRST CLOCK SPEED AND A CIRCUIT HAVING A SLOWER CLOCK SPEED

(75) Inventor: Anuradha Bommaji, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 662 days.

(21) Appl. No.: 09/769,847

(22) Filed: Jan. 25, 2001

(65) Prior Publication Data

US 2002/0099968 A1 Jul. 25, 2002

(51) Int. Cl.$^7$ ................................................. G06F 1/12
(52) U.S. Cl. ..................................... 713/400; 345/522
(58) Field of Search .................... 345/522; 713/400; 716/1

(56) References Cited

U.S. PATENT DOCUMENTS 5,917,505 A  *  6/1999  Larson ........................ 345/522

6,061,073 A  *  5/2000  Larson ........................ 345/501

* cited by examiner

*Primary Examiner*—Thomas Lee
*Assistant Examiner*—Albert Wang
(74) *Attorney, Agent, or Firm*—Bever, Hoffman & Harms, LLP; Jeanette S. Harms

(57) ABSTRACT

A method and system is provided for synchronizing data between an application layer having a first clock speed and a circuit having a second clock speed. The first clock speed generally being faster than the second clock speed. The second clock speed typically being determined by an appropriate standard. Data and a function opcode representative of a computation to be performed on at least a portion of the data, is received at a synchronizing element from the application layer. The synchronizing element may be a first in first out type device. The data and its associated function opcodes are stored by the synchronizing element until transmitted to a circuit in accordance with the second clock speed. A compute logic in the circuit performs a computation on at least a portion of the data based on the associated function opcode. A system is also provided for synchronizing data between an application layer and a logic circuit. The system may be advantageously employed in audio/visual applications.

17 Claims, 1 Drawing Sheet

SYNCHRONIZING DATA AND FUNCTION OPCODES BETWEEN AN APPLICATION LAYER HAVING A FIRST CLOCK SPEED AND A CIRCUIT HAVING A SLOWER CLOCK SPEED

BACKGROUND OF THE INVENTION

The present invention relates to a method and system for improving clock speed for data and function opcodes between a first device at a first clock speed and a second device at a second clock speed.

As computational capabilities continue to increase, more powerful applications are continually being developed. These new applications have been used in a variety of areas, such as in audio/video (AV) applications. Reusable Internet protocol (IP) cores, such as AV cores, typically use a great deal of computationally intensive logic and run at high clock speeds. These AV cores generally use a first clock for an application layer and a second clock for internal logic. The internal logic is typically implemented using a standard protocol, such as IEEE-1394. The application layer requires a faster clock speed than the internal logic.

Currently, computations are performed at the first clock speed in the application layer and the results are sent to a synchronizing element. The results are then used in the internal logic at the slower, second clock speed. The synchronizing element has typically been implemented by a first in first out (FIFO) type device. Doing computations in the faster, first clock domain requires tight synthesis and imposes numerous layout constraints on the compute logic. These problems are generally resolved by slowing the first clock speed to accommodate the computations. Unfortunately, this reduces the performance of the application layer.

Accordingly, there is a need for a method and system for providing data and function opcodes between a first device, such as an application layer, at a first clock speed and a second device, such as internal logic, at a second clock speed. Such a method and system should reduce, or lessen, requirements of synthesis and logic layout and which reduces a need to slow the first clock speed in order to perform complex computations.

SUMMARY OF THE INVENTION

This need is met by a method and system in accordance with the present invention in which synchronized data and function opcodes are passed from an application layer having a first clock speed to a logic circuit having a slower second clock speed relative to the first clock speed. Computations on the data based on an associated function opcodes are then performed by compute logic in the logic circuit running at the second clock speed. Preferably, the second clock speed is slower than the first clock speed. For example, the second clock speed may be approximately 50 MHz and the first clock speed approximately 100 MHz.

In accordance with the present invention, a method is provided for synchronizing data between an application -having a first clock speed and a circuit, such as a logic circuit, having a second clock speed slower than the first clock speed. Data and a function opcode are received from the application. The data and the function opcode are then provided to the circuit in accordance with the second clock speed. A computation on at least a portion of the data based on the function opcode is performed at the second clock speed. The computation may be performed by compute logic in the circuit.

The second clock speed may be determined by a standard, such as an IEEE-1394 high speed serial bus standard. The IEEE-1394 standard sets the second clock speed at approximately 50 MHz. The data may be received from the application and provided to the circuit by a first in first out type device which may be implemented as a soft macro.

In accordance with another aspect of the present invention, a method for synchronizing data sent from an application layer having a first clock speed to a logic circuit having a second clock speed is provided. The second clock speed is dictated, or is in accordance with, a standard, such as IEEE-1394. The method comprises the steps of: defining a set of computations to be performed at the second clock speed; receiving data from the application layer for which one of the set of computations is to be performed; receiving a function opcode representative of the one of the set of computations; sending the data and the function opcode to the logic circuit; and performing the one of the set of computations on the data at the second clock speed.

In accordance with yet another aspect of the present invention, a system for transmitting data between an application layer having a first clock speed and a logic circuit having a second clock speed. A synchronizing element receives the data and a function opcode from the application layer and transmits the data and function opcode in accordance with the second clock speed. A compute logic opening at the second clock speed receives the data and the function operand and performs a computation associated with the function opcode on the data.

These and other features and advantages of the present invention will become apparent from the following detailed description, the accompanying drawings and the appended claims.

BRIEF DESCRIPTION OF THE DRAWING

The foregoing and other advantages of the invention will become apparent upon reading the following detailed description and upon reference to the drawing in which.

DETAILED DESCRIPTION OF THE INVENTION

Figure 1:
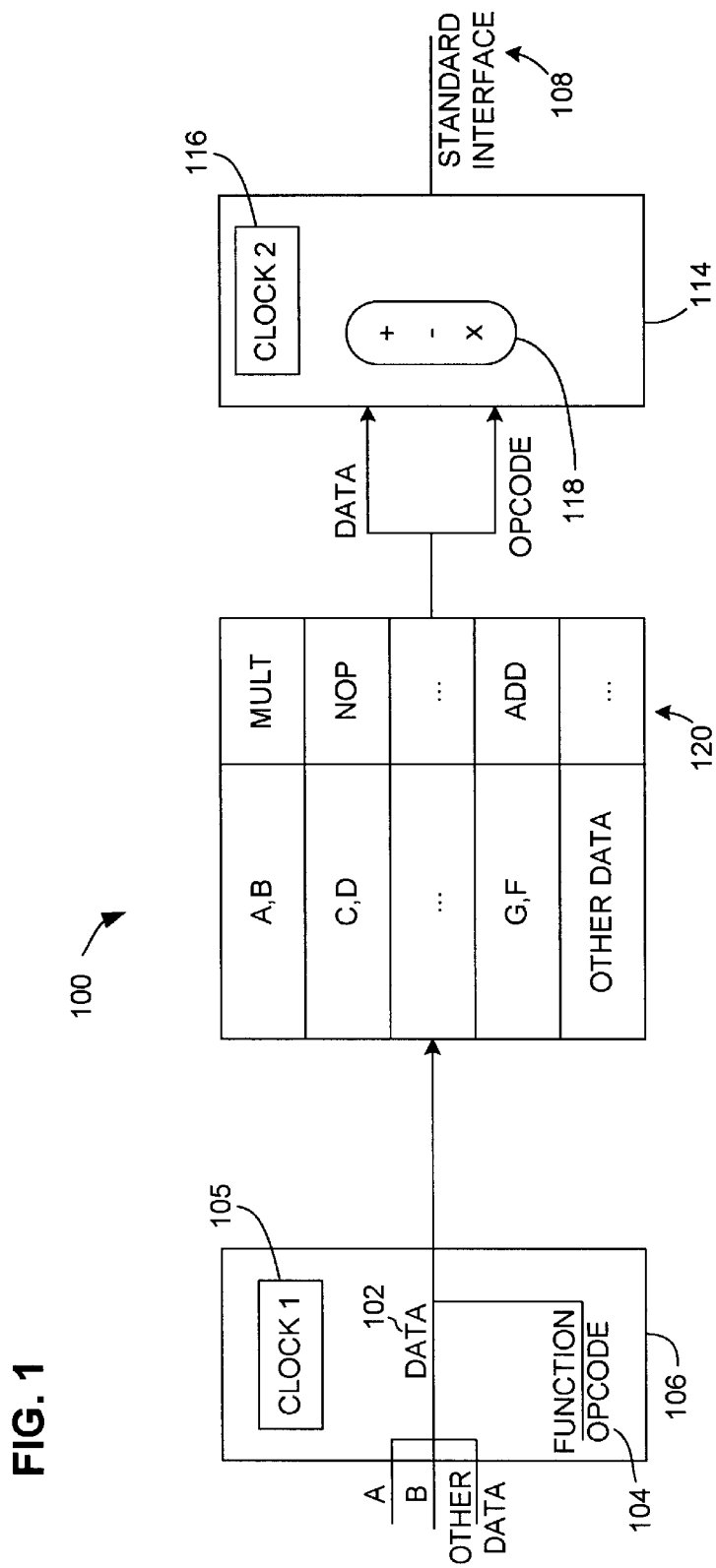
FIG. 1 is a graphic representation of a system in accordance with the present invention for transmitting data between a first device at a first clock speed and a second device at a second clock speed.

A system 100 for transmitting data 102 and a function opcode 104 between an application layer 106 having a first clock speed and a standard interface 108 in accordance with the present invention is shown in FIG. 1. The function opcode 104 is representative of a specific computation, such as multiplication, to be performed on at least a portion of the data 102. The application layer 106 operates at the first clock speed provided by a first clock 105. The data 102 and the function opcode 104, or operand, are sent by the application layer 106 to a synchronizing element 112. The synchronizing element 112 provides the data 102 and the opcode 104 to a logic circuit 114 in accordance with a second clock speed of a second clock 116 associated with the logic circuit 114.

Since the logic circuit 114 communicates with other elements, such as over a high speed bus, the logic circuit 114 may be implemented using the standard interface 108, such as the IEEE-1394. As is known in the art, IEEE-1394 is a standard for high speed serial bus operation and is especially applicable to audio/video (AV) applications. For operation in accordance with IEEE-1394, the second clock speed is approximately 50 MHz.

In general, the application layer 106 in a typical AV application operates at a much higher speed than the standard. For example, the first clock speed may be approximately 100 MHz or about twice as fast as the second, or standard, clock speed of 50 MHz. Consequently, performing computations at the first clock speed requires a relatively tight synthesis and imposes layout constraints. In prior systems, computations which could not be performed at the first clock rate would be accommodated by slowing down the first clock speed until the computation could be performed. As will be readily apparent to those skilled in the art, reducing the first clock speed unfortunately reduces the performance of the application layer 106.

In accordance with one aspect of the present invention, the data 102 and the function opcode 104 are received by the synchronizing element 112 from the application layer 106. The synchronizing element 112 may be a first in first out (FIFO) type of device implemented as a hard macro. The synchronizing element 1 12 then provides the data 102 and the function opcode 104 to the logic circuit 114. A compute logic 118 in the logic circuit 114 performs one or more computations on at least a portion of the data 102 in accordance with the function opcode 106 to obtain a computation result. For example, the function opcode 104 may instruct the logic circuit 114 to multiply data A and data B. Since the computation is now being performed in accordance with the slower second clock speed, more time can be used to perform the computation. Thus, it may be possible to loosen the synthesis and layout constraints for the compute logic 118 when the computations are performed at the second clock speed.

Further, the present invention permits a reduction in the number of logic levels on the application layer 106, thereby allowing synthesis constraints to be set for higher clock frequencies, if desired. Preferably, the FIFO device 112 stores the function opcodes 106 representative of a type of arithmetic operation, or computation, to be performed received from the application layer 106. Examples of function opcodes with associated exemplary data are shown stored in respective columns 120 and 122 in the FIFO device 112.

The synchronizing element 112 and the compute logic 118 may be implemented as soft macros, or alternatively as hard macros. Specific design parameters and requirements will determine how a particular system is implemented. The present invention therefore permits the first clock speed, or the application clock speed, to remain high, even with complex computations being performed. This causes an increase in effective performance of the system 100 compared to prior systems in which the application clock speed would be slowed to accommodate complex computations. Further, providing the compute logic 118 in the logic circuit 114 (and at the slower second clock speed) may loosen the synthesis and layout constraints and, thus permit firm layouts substantially independent of process.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method for improving clock speed in a system including an application optimized for processing data according to relatively simple computations at a first, relatively fast clock speed, the system also including a circuit optimized for processing data according to relatively complex computations at a second, relatively slow clock speed, the method comprising the steps of:

causing the application to identify and transmit data and a function opcode associated with the relatively complex computations in accordance with the first clock speed;

receiving and temporarily storing the data and the function opcode transmitted from the application;

providing the data and the function opcode to the circuit in accordance with the second clock speed; and causing the circuit to perform the associated relatively complex computation on at least a portion of the data based on the function opcode at the second clock speed.

2. The method as recited in claim 1 wherein the step of causing the circuit to perform comprises the step of:

performing the associated relatively complex computation on the data by compute logic in the circuit.

3. The method as recited in claim 1 wherein the circuit is a logic circuit.

4. The method as recited in claim 1 wherein the second clock speed is determined by a standards requirement.

5. The method as recited in claim 1 wherein the step of receiving data and providing the data is performed by a synchronizing element.

6. A method for improving clock speed for data between an application having a first clock speed and a circuit having a second clock speed comprising the steps of:

receiving data and a function opcode from the application;

providing the data and the function opcode to the circuit in accordance with the second clock speed; and performing a computation on at least a portion of the data based on the function opcode at the second clock speed, wherein the step of receiving data and providing the data is performed by a synchronizing element, and wherein the synchronizing element comprises a first in first out type device implemented as a soft macro.

7. The method as recited in claim 1 wherein the step of causing the circuit to perform the associated relatively complex computation comprises the step of:

performing a computation function on at least a portion of the data.

8. A method for processing data in a system including an application layer optimized for processing the data according to relatively simple computations at a first, relatively fast clock speed, the system also including a logic circuit optimized for processing the data according to relatively complex computations at a second, relatively slow clock speed, the second clock speed being in accordance with a standard, the method comprising the steps of:

defining a set of said relatively complex computations to be performed at the second clock speed;

causing the application layer to identify and transmit data and a function opcode associated with one of the set of relatively complex computations;

receiving and temporarily storing the data from the application layer for which one of the set of computations is to be performed;

receiving the function opcode representative of the one of the set of relatively complex computations;

sending the data and the function opcode to the logic circuit; and causing the circuit to perform the one of the set of relatively complex computations on the data at the second clock speed.

9. The method as recited in claim 8 wherein the first clock speed is approximately 100 MHz.

10. The method as recited in claim 9 wherein the second clock speed is approximately 50 MHz.

11. The method as recited in claim 8 wherein the step of receiving data is performed by a first in first out device.

12. The method as recited in claim 11 wherein the first in first out device is implemented by a soft macro.

13. A system for selectively processing data according to one of relatively simple computations at a first, relatively fast clock speed, and relatively complex computations at a second, relatively slow clock speed, the system comprising:

an application layer for executing first function opcodes associated with the relatively simple computations at the first clock speed, and for identifying and transmitting a second function opcode associated with one of the relatively complex computations in accordance with the first clock speed;

a synchronizing element for receiving data and the second function opcode from the application layer and for transmitting the data and the second function opcode in accordance with the second clock speed; and a compute logic operating at the second clock speed for receiving the data and the second function opcode and for performing a computation associated with the second function opcode on the data.

14. The system as recited in claim 13 wherein the second clock speed is determined by a standard.

15. The system as recited in claim 13 which operates in an audio/visual application.

16. The system as recited in claim 13 wherein the synchronizing element is a first in first out type device.

17. The system as recited in claim 16 wherein the first in first out device is implemented as a soft macro.

* * * * *